(12) United States Patent
Hu et al.

(10) Patent No.: US 8,144,574 B1
(45) Date of Patent: Mar. 27, 2012

(54) DISTRIBUTED CONTROL PACKET PROCESSING

(75) Inventors: Jie Hu, Santa Rosa, CA (US); Cory Dean Gordon, Colbert, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 539 days.

(21) Appl. No.: 11/933,250

(22) Filed: Oct. 31, 2007

(51) Int. Cl.
*G01R 31/08* (2006.01)

(52) U.S. Cl. .................................... 370/218; 370/395.5

(58) Field of Classification Search ................... 370/389, 370/392, 250, 352, 236.2, 230, 252, 218
See application file for complete search history.

(56) References Cited

U.S. PATENT DOCUMENTS

| | | | |
|---|---|---|---|
| 6,678,827 B1 * | 1/2004 | Rothermel et al. | 726/6 |
| 7,046,693 B1 | 5/2006 | Lapointe et al. | |
| 7,310,664 B1 * | 12/2007 | Merchant et al. | 709/220 |
| 7,411,915 B1 * | 8/2008 | Spain et al. | 370/250 |
| 7,512,141 B2 | 3/2009 | Elie-Dit-Cosaque et al. | |
| 7,516,211 B1 | 4/2009 | Gourlay et al. | |
| 2003/0137981 A1 * | 7/2003 | Tsai et al. | 370/392 |
| 2004/0109418 A1 | 6/2004 | Fedorkow et al. | |
| 2007/0242602 A1 | 10/2007 | Pang et al. | |
| 2007/0263535 A1 * | 11/2007 | Shabtay | 370/230 |
| 2008/0279105 A1 * | 11/2008 | Absillis et al. | 370/236.2 |
| 2008/0301759 A1 * | 12/2008 | Rivers et al. | 726/1 |
| 2009/0003313 A1 * | 1/2009 | Busch et al. | 370/352 |

OTHER PUBLICATIONS

Ohta, Hiroshi, "Ethernet OAM and Protection Switching," International Telecommunication Union, ITU-T Workshop, NGN and its Transport Network, Kobe, Apr. 20-21, 2006.
Cisco Systems, Inc,"Ethernet Operations, Administration, and Maintenance" Sep. 2007, 1992-2007.
ITU-T Recommendation Y.1731-"OAM Functions and mechanisms for Ethernet based networks", Feb. 2008.

* cited by examiner

*Primary Examiner* — Ricky Ngo
*Assistant Examiner* — David Oveissi
(74) *Attorney, Agent, or Firm* — Tyler S. Brown

(57) ABSTRACT

Packet switch operating methods and packet switches, using first processing circuitry of the packet switch, specify a configuration for a control packet processing procedure implemented by different second processing circuitry of the packet switch, communicate the configuration to the second processing circuitry, and using the second processing circuitry, receive a control packet, examine contents of the control packet, and process the control packet according to the control packet processing procedure, the control packet processing procedure being configured according to the configuration.

19 Claims, 8 Drawing Sheets

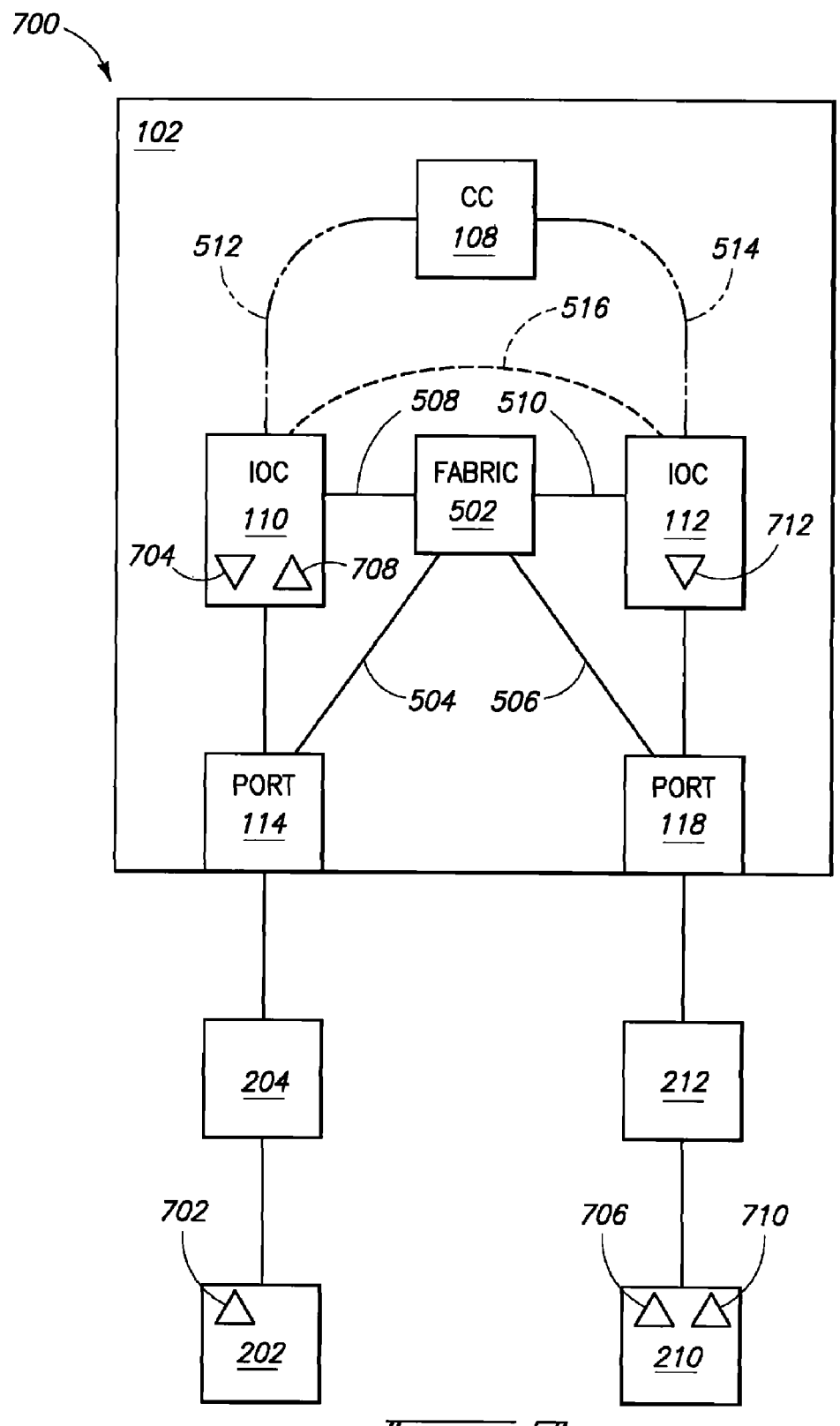

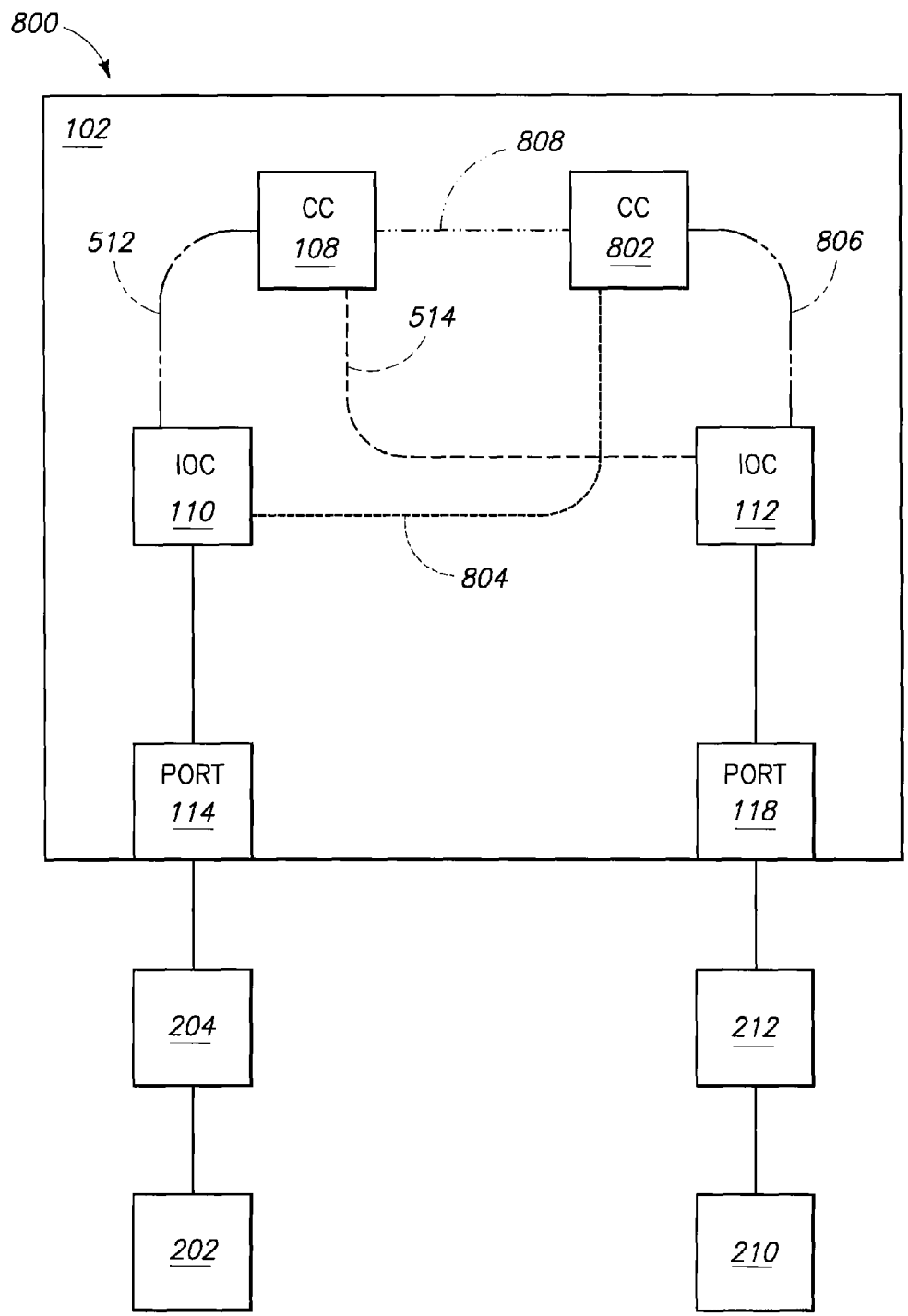

US 8,144,574 B1

DISTRIBUTED CONTROL PACKET PROCESSING

RELATED APPLICATION DATA

This application is related to simultaneously filed U.S. patent application Ser. No. 11/933,307 entitled "Distributed Control Packet Transmission" and naming Jie Hu and Cory Dean Gordon as inventors.

TECHNICAL FIELD

The present invention, in various embodiments, relates to distributed control packet processing.

BACKGROUND OF THE INVENTION

Service providers are increasingly deploying Ethernet networks over which they offer many different services to subscribers. To ensure the services meet parameters imposed by the service provider and/or the subscribers, service providers may use layer-two control protocols to configure, monitor, and manage their Ethernet networks. For example, continuity check messages may be used to monitor end-to-end connectivity of a service and spanning tree bridge protocol data units may be used to prevent network loops.

BRIEF DESCRIPTION OF THE DRAWINGS

Preferred embodiments of the invention are described below with reference to the following accompanying drawings.

FIG. 7 is a block diagram of a further network.
FIG. 8 is a block diagram of a still further network.

DETAILED DESCRIPTION OF THE PREFERRED EMBODIMENTS

Figure 1:
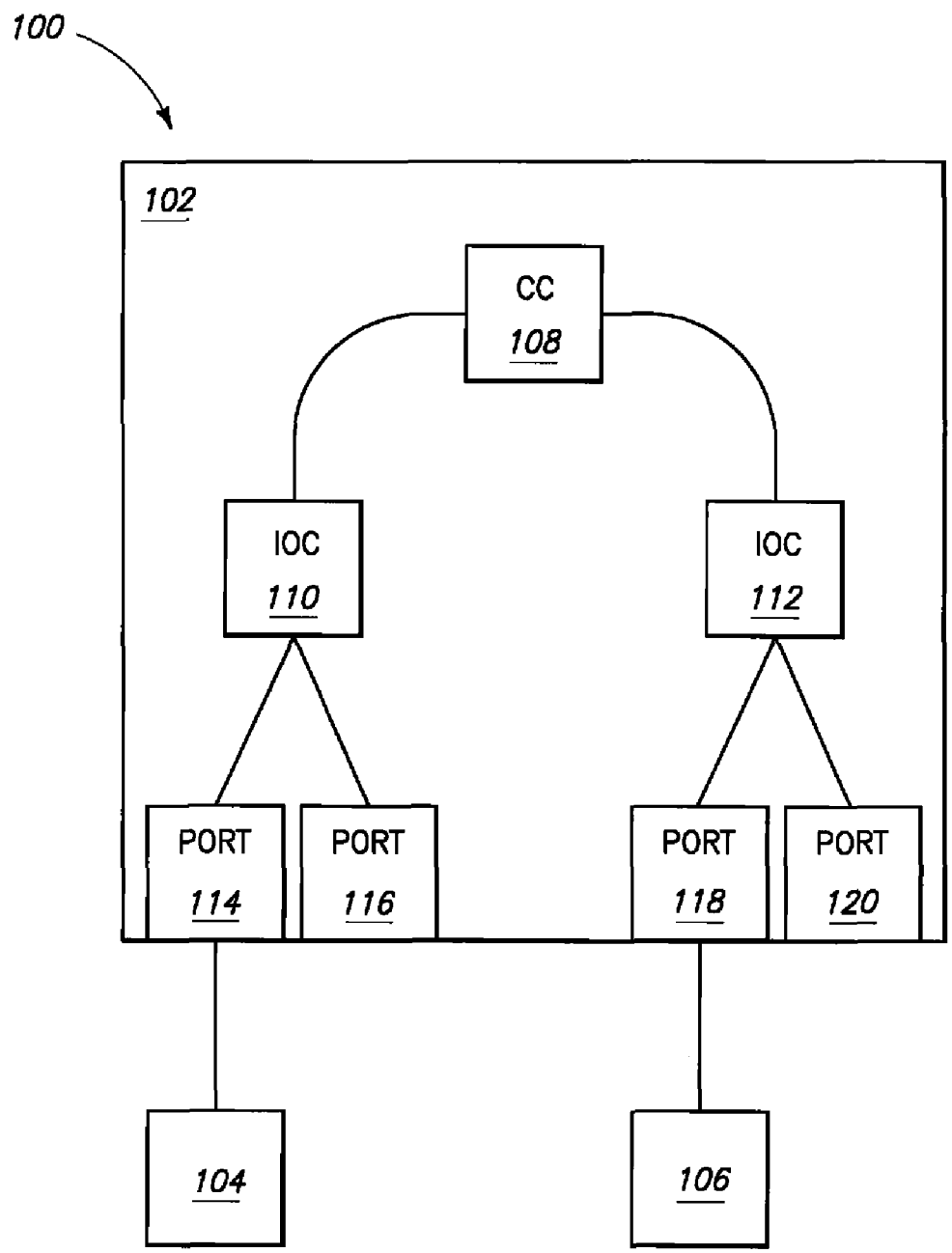
FIG. 1 is a block diagram of a network.

According to one aspect of the invention, a packet switch includes first processing circuitry and second processing circuitry. The second processing circuitry is configured to receive a control packet from a port of the packet switch and to update a status of a layer-two control protocol with respect to the port based on information conveyed by the control packet. The second processing circuitry may be configured to prevent the control packet from being forwarded to the first processing circuitry. The control packet conforms to the layer-two control protocol. The first processing circuitry is coupled to the second processing circuitry and is configured to receive the information describing the status and to change a configuration of the second processing circuitry based on the information.

The second processing circuitry may be configured to receive configuration information affecting the status of the layer-two control protocol with respect to the port from the first processing circuitry and in response periodically transmit control packets conforming to the layer-two protocol that are based on the configuration information without receiving additional information from the first processing circuitry.

In one configuration, the packet switch may include a switching fabric connected to the port and to the first processing circuitry. The first processing circuitry may be configured to forward a second control packet to the port via the switching fabric.

The packet switch may include third processing circuitry configured to receive a second control packet from a different second port of the packet switch and to update a second status of the layer-two control protocol with respect to the second port based on information conveyed by the second control packet. The second control packet may conform to the layer-two control protocol. The first processing circuitry may be coupled to the third processing circuitry and may be configured to receive information describing the second status and to change a configuration of the second processing circuitry and/or the third processing circuitry based on the information describing the second status.

The switching fabric may be connected to the first and second ports and the second and third processing circuitry. The switching fabric may be configured to relay packets between the first port and the second port. The second processing circuitry may be configured to forward a control packet conforming to the layer-two protocol to the second port via the switching fabric.

The second processing circuitry may be coupled to the third processing circuitry and the second processing circuitry may be configured to instruct the third processing circuitry to transmit a control packet conforming to the layer-two control protocol to the second port.

In one configuration, the packet switch may include a control module including the first processing circuitry, a first input/output module including the second processing circuitry, a second input/output module including the third processing circuitry, and a chassis. The chassis may house the first input/output module, the second input/output module, and the control module.

FIG. 1 illustrates a network 100. Network 100 includes a packet switch 102, and two devices 104 and 106. Packet switch 102 includes control circuitry 108, input/output circuitry 110, input/output circuitry 112, and four ports 114, 116, 118, and 120. Input/output circuitry 110 and input/output circuitry 112 are both connected to control circuitry 108. Input/output circuitry 110 is connected to a subset of the ports of packet switch 102, namely ports 114 and 116. Input/output circuitry 112 is connected to other ports of packet switch 102, namely ports 118 and 120. Port 114 is connected to device 104 and port 118 is connected to device 106. Of course, packet switch 102 could include additional ports and additional input/output circuitry. Four ports and two instances of input/output circuitry have been illustrated for simplicity.

Control circuitry 108, input/output circuitry 110, and input/output circuitry 112 may comprise circuitry configured to implement desired programming provided by appropriate media in at least one embodiment. For example, each of control circuitry 108, input/output circuitry 110, and input/output circuitry 112 may be implemented as one or more of a processor and/or other structure configured to execute executable instructions including, for example, software and/or firmware instructions, and/or hardware circuitry. Exemplary embodiments include hardware logic, programmable gate arrays, field programmable gate arrays, application specific integrated circuits, network processing units, state machines, and/or other structures alone or in combination with a processor. These examples are for illustration; other configurations are possible.

In one configuration, input/output circuitry 110 and input/output circuitry 112 may be implemented as network processing units programmed to perform the functionality described herein and control circuitry 108 may be implemented as a processor programmed to perform the functionality described herein.

Devices 104 and 106 may be devices capable of sending and receiving packets (e.g., Ethernet packet switches, routers, computers, etc.). Devices 104 and 106 may communicate with packet switch 102 and with other devices connected directly or indirectly to packet switch 102. For example, device 104 may send Ethernet packets addressed to a destination device (not illustrated) via packet switch 102. Upon receiving the Ethernet packets, packet switch 102 may forward the packets via a port of packet switch 102 connected directly or indirectly to the destination device.

In one configuration, devices 104 and 106 may communicate with packet switch 102 using control packets (e.g., Institute of Electrical and Electronics Engineers (IEEE) 802.1ag connectivity fault management protocol data units (CFMPDUs), bridge protocol data units (BPDUs), IEEE 802.1AB Link Layer Discovery Protocol (LLDP) packets, Internet Group Management Protocol (IGMP) packets, etc.). Control packets may perform many different purposes in a network such as network 100. For example, some control packets (e.g., IEEE 802.3ah Operations, Administration and Maintenance (OAM) control packets and CFMPDUs) may be used to facilitate testing of a network such as continuity testing, bandwidth testing, or error rate testing.

Other control packets (e.g., LLDP control packets) may enable a device in a network to request configuration information describing the configuration of another device in the network. A device receiving the request for configuration information may reply using a control packet containing the requested information.

Still other control packets (e.g., BPDUs) may convey information describing a characteristic or configuration of a network. A device receiving the configuration information may alter its own configuration based on the information. For example, upon receiving a topology change notice within a BPDU, a packet switch may block or unblock one or more of its ports.

Generally, control packets are considered part of a control plane of a network rather than part of a data plane of a network. Control packets may be transmitted in-band along with data plane packets in some configurations. Often, control packets may be contained within a network rather than being forwarded to an end user or device connected to the network.

A control packet may be associated with a control protocol. For example, a CFMPDU may be associated with the CFM protocol. A device (e.g., a packet switch) may support one or more control protocols. In other words, the device may be configured to receive and process control packets associated with the protocol according to the protocol. To do so, the device may implement a control packet processing procedure for control packets associated with the protocol. The control packet processing procedure may specify an action to be taken upon receiving a particular control packet associated with the protocol.

For example, upon receiving an LLDP control packet from device 104, a control packet processing procedure (e.g., a state machine) of packet switch 102 may specify that an LLDP control packet containing configuration information requested by the received LLDP control packet be transmitted to device 104. Or, by way of another example, upon receiving a loopback message (LBM) contained within a CFMPDU from device 104, a control packet processing procedure of packet switch 102 may specify that packet switch 102 should transmit a loopback reply message.

Known packet switches may implement control packet processing procedures in control circuitry. Accordingly, control packets received on a port of the known switch may be detected by input/output circuitry and forwarded to the control circuitry for processing according to the control packet processing procedure. However, such known packet switches may perform unacceptably when they receive a large number of control packets.

For example, if the known packet switch has a large number of ports and is configured to transmit a CCM control packet and receive a CCM control packet on each port every ten milliseconds, the number of control packets that the control circuitry will need to either create and transmit or receive and analyze may overwhelm the capabilities of the control circuitry. Consequently, known packet switches might not be able to rely on CCMs for rapid detection of connectivity issues. Transmitting every ten milliseconds may enable the packet switch to detect and mitigate network connectivity problems within an acceptable amount of time (e.g., thirty milliseconds).

According to another aspect of the invention, a packet switch operating method includes using first processing circuitry of the packet switch to specify a configuration for a control packet processing procedure implemented by different second processing circuitry of the packet switch and communicating the configuration to the second processing circuitry. The method also includes using the second processing circuitry to receive a control packet, examine contents of the control packet, and process the control packet according to the control packet processing procedure. The control packet processing procedure is configured according to the configuration.

The control packet may conform to a layer-two control protocol and the packet switch may be configured to process control packets according to the layer-two control protocol. Furthermore, the control packet may be received from another packet switch configured to process control packets according to the layer-two control protocol.

The control packet may include a request for information describing a configuration of the packet switch and the method may include transmitting a second control packet including the information describing the configuration of the packet switch in response to receiving the first control packet.

The control packet may convey information describing a characteristic of a network to which the packet switch is connected and processing the control packet may include modifying a configuration of the packet switch based on the information. For example, processing the control packet may include changing an operational state of a port of the packet switch from which the second processing circuitry received the control packet.

Processing the control packet may include forwarding at least a portion of the control packet to the first processing circuitry. The method may include using the second processing circuitry to receive a second control packet and to process the second control packet according to the control packet processing procedure without forwarding a portion of the second control packet or the entire second control packet to the first processing circuitry.

The control packet processing procedure may also be implemented by different third processing circuitry of the packet switch. The method may include using the first processing circuitry to specify a different second configuration for the control packet processing procedure and communicating the second configuration to the third processing circuitry. The method may further include using the third circuitry to receive a second control packet and process the second control packet according to the control packet processing procedure implemented by the third processing circuitry. The control packet processing procedure implemented by the third processing circuitry may be configured according to the second configuration.

Processing the control packet using the second processing circuitry may include specifying a different third configuration for the control packet processing procedure implemented by the third processing circuitry. The method may include communicating the third configuration to the third processing circuitry.

According to another aspect of the invention, a packet switch operating method includes using first processing circuitry of the packet switch to specify a configuration for a control packet processing procedure implemented by different second processing circuitry of the packet switch, communicating the configuration to the second processing circuitry, and using the second processing circuitry to transmit control packets according to the control packet processing procedure. The control packet processing procedure may be configured according to the configuration. The control packet processing procedure may include a state machine configured to implement a layer-two control protocol feature.

The control packets may be Ethernet packets conforming to a layer-two control protocol. Transmitting the control packets may include forming the control packets and transmitting the control packets to another device via a port of the packet switch. In some configurations, the first processing circuitry might not be aware that the second processing circuitry has transmitted the control packets.

The configuration may specify a frequency with which the second processing circuitry should transmit individual ones of the control packets. The configuration may specify another device to which the second processing circuitry should transmit the control packets and transmitting the control packets may include transmitting the control packets to the other device via a port of the packet switch.

The method may include using the second processing circuitry to receive a request to transmit a particular control frame from the first processing circuitry. The request may include at least a portion of the particular control frame. The method may also include using the second processing circuitry to transmit the particular control frame via a port of the packet switch to another device connected to the port.

The control packets may be Institute of Electrical and Electronics Engineers (IEEE) 802.1ag connectivity fault management protocol data units (CFMPDUs) such as continuity check messages (CCMs), IEEE 802.1AB Link Layer Discovery Protocol (LLDP) packets, IEEE 802.3ah Operations, Administration and Maintenance (OAM) packets, Link Aggregation Control Protocol (LACP) packets, Spanning Tree Protocol (STP) packets, STP Uplink Fast packets, Rapid Spanning Tree Protocol (RSTP) packets, Multiple Spanning Tree Protocol (MSTP) packets, Cisco Discovery Protocol (CDP) packets, Per VLAN Spanning Tree (PVST) packets, IEEE 802.1x packets, Unidirectional Link Detection (UDLD) packets, Port Aggregation Protocol (PAGP) packets, marker protocol packets, Generic Attribute Registration Protocol (GARP) Virtual Local Area Network (VLAN) Registration Protocol (GVRP) packets, GARP Multicast Registration Protocol (GMRP) packets, IEEE 802.1ak Multiple Registration Protocol (MRP) packets, International Telecommunications Union—Telecommunications (ITU-T) Y.1731 Ethernet OAM packets, or IGMP packets.

Returning now to FIG. 1, packet switch 102 may process large numbers of control packets without overwhelming control circuitry 108. To do so, control circuitry 108 may receive a desired control protocol configuration from a user or management system and then configure input/output circuitry 110 and/or input/output circuitry 112 to perform part or all of the control packet processing associated with the control protocol.

Input/output circuitry 110 and 112 may be configured to perform a control packet processing procedure associated with the control protocol but may rely on one or more parameters in performing the procedure. A user may supply these parameters to control circuitry 108, which may then provide the parameters to input/output circuitry 110 and 112.

For example, the control packet processing procedure may be a CCM transmitting procedure which, when executed by input/output circuitry 110, causes input/output circuitry 110 to form CCMs and transmit the CCMs at a particular rate. A user or management system may supply control circuitry 108 with a CCM transmission rate and maintenance association identification and control circuitry 108 may then configure input/output circuitry 110 with the rate and the maintenance association identification. In some configurations, once input/output circuitry 110 has been configured by control circuitry 108, input/output circuitry 110 may transmit CCMs independent of control circuitry 108. In other words, input/output circuitry 110 may form and transmit CCMs without further input or direction from control circuitry 108. Consequently, control circuitry 108 might not receive or be aware of individual CCMs transmitted by input/output circuitry 110.

In some configurations, input/output circuitry 110 and 112 may perform the same control packet processing procedure but may each receive different configurations from control circuitry 108. For example, input/output circuitry 110 may be configured to transmit CCMs at a rate to a MEP residing on device 104 and input/output circuitry 112 may be configured to transmit CCMs at the same rate but to a different MEP residing on device 106.

The control packet processing procedure may alternatively or additionally process control packets received by the input/output circuitry. Processing a control packet using the control packet processing procedure may cause a state transition within a state machine associated with the control packet processing procedure. For example, input/output circuitry 110 may be capable of monitoring BPDUs received from device 104 via port 114 and notifying control circuitry 108 in response to receiving a particular BPDU.

By way of example, control circuitry 108 may configure input/output circuitry 110 to notify control circuitry 108 if input/output circuitry 110 receives a BPDU containing a topology change notice (TCN). In this manner, input/output circuitry 110 may perform the burdensome chore of receiving and processing BPDUs that do not contain TCNs for control circuitry 108, thereby reducing the load on control circuitry 108. In response to being notified of a TCN by input/output circuitry 110, control circuitry 108 may make a configuration change to input/output circuitry 110. For example, control circuitry 108 may configure input/output circuitry 110 to block port 114.

In some configurations, control circuitry 108 might not be aware that a control packet has been received by input/output circuitry 110. For example, input/output circuitry 110 might receive a BPDU that does not contain a TCN and therefore might not make control circuitry 108 aware of the BPDU by preventing the BPDU from being forwarded to control circuitry 108 (e.g., by discarding the BPDU after determining that the BPDU does not contain a TCN).

In other configurations, input/output circuitry 110 may forward a control packet to control circuitry 108 without processing the received control packet. For example, input/ output circuitry 110 might receive a CFMPDU containing a Link Trace Message (LTM) sent by device 104. The control packet processing procedure implemented on input/output circuitry 110 might not be configured to process the LTM. Consequently, input/output circuitry 110 may forward the LTM to control circuitry 108. In response to receiving the LTM, control circuitry 108 may form a response CFMPDU and forward the response CFMPDU to device 104 via input/output circuitry 110.

Alternatively, upon receiving the LTM sent by device 104, input/output circuitry 110 may send a message to control circuitry 108 informing control circuitry 108 that the LTM was received instead of forwarding the LTM itself to control circuitry 108. In response, control circuitry 108 may instruct input/output circuitry 110 to form the response CFMPDU and transmit the response CFMPDU to device 104.

Various control packet processing procedures may be implemented on input/output circuitry 110 and 112 so that the amount of control packet processing performed by control circuitry 108 is reduced. For example, control packet processing procedures for handling frequently received or frequently transmitted control packets may be implemented on input/output circuitry 110 and 112 and control packet processing procedures for handling rarely received and rarely transmitted control packets may be implemented on control circuitry 108.

In one configuration, additional input/output circuitry (not illustrated) may be connected to port 114. In this configuration, input/output circuitry 110 may be configured to implement control packet processing procedures for port 114 for a first set of control protocols and the additional input/output circuitry may be configured to implement control packet processing procedures for port 114 for a second set of control protocols.

Consequently, the burden of processing control packets may be distributed among input/output circuitry 110 and 112 (and in some cases, additional input/output circuitry) and control circuitry 108 rather than being performed substantially entirely by control circuitry 108 as is done in some known packet switches.

According to another aspect of the invention, a packet switch operating method includes using first processing circuitry of the packet switch to configure different second processing circuitry of the packet switch to periodically create layer-two control packets at a rate and to forward the layer-two control packets to a destination at the rate. The method also includes using the second processing circuitry to create the control packets at the rate and forwarding the control packets to the destination. Creating the control packets may include creating the control packets without having previously received a copy of the control packets from the first processing circuitry.

The layer-two control packets may be CCMs conforming to the IEEE 802.1ag standard and/or the ITU-T Y.1731 standard and the destination may be a remote maintenance endpoint implemented on a device coupled to the packet switch. Alternatively, the layer-two control packets may be spanning tree bridge protocol data units.

The method may include using the first processing circuitry of the packet switch to configure different third processing circuitry of the packet switch to periodically create second layer-two control packets at a second rate and to forward the second layer-two control packets to a different second destination at the second rate and using the third processing circuitry to create the second control packets at the second rate and forward the second control packets to the second destination.

Forwarding the control packets may include forwarding the control packets to a port of the packet switch via a switching fabric of the packet switch. Forwarding the second control packets may include forwarding the second control packets to the port of the packet switch. The first port may be connected to the third processing circuitry.

The method may also include using the second processing circuitry to receive a CCM from the destination. The CCM may include a defect indicator. The method may also include, in response to receiving the CCM, using the second processing circuitry to inform the third processing circuitry of the defect indicator and subsequent to receiving the CCM, using the second processing circuitry to create third control packets at the rate and forward the third control packets to the destination. The third control packets may include the defect indicator.

Subsequent to informing the third processing circuitry, the method may also include using the third processing circuitry to create fourth control packets at the second rate and to forward the fourth control packets to the second destination. The fourth control packets may include the defect indicator.

The method may also include using the second processing circuitry to receive a CCM from the remote maintenance endpoint. The CCM may include a defect indicator. The method may further include using the second processing circuitry to inform the first processing circuitry of the defect indicator in response to receiving the CCM and subsequent to receiving the CCM, using the second processing circuitry to create second control packets at the rate and forward the control packets to the remote maintenance endpoint. The second control packets may include defect indicators.

According to another aspect of the invention, a packet switch operating method includes using first processing circuitry of the packet switch to instruct second processing circuitry of the packet switch to monitor layer-two control packets received by the second processing circuitry and to notify the first processing circuitry if a condition related to timing of receipt of the layer-two control packets by the second circuitry has been satisfied. The method also includes using the second processing circuitry to receive the control packets, determining, based on one of the received control packets, that the condition is satisfied, and notifying the first processing circuitry that the condition is satisfied.

The method may also include using the second processing circuitry to receive a loopback message (LBM) CFMPDU or link trace message (LTM) CFMPDU and forwarding at least a portion of the LBM or LTM to the first processing circuitry. The layer-two control packets may be connectivity fault management protocol data units (CFMPDUs) conforming to the Institute of Electrical and Electronics Engineers (IEEE) 802.1ag standard and/or the ITU-T Y.1731 standard. The one received control packet may be a Continuity Check Message (CCM).

Instructing the second processing circuitry may include providing to the second processing circuitry an identifier identifying a device originating the CCMs and a fault period comprising an amount of time. Determining the condition is satisfied may include determining that the fault period has expired since receiving the one control packet and that no additional CCMs have been received by the second processing circuitry from the device during the fault period.

Instructing using the first processing circuitry may include instructing the second processing circuitry to monitor layer-two control packets sent by a first maintenance endpoint and received by the second processing circuitry. The method may include using the second circuitry to receive a layer-two control packet from a second maintenance endpoint, determine that the second circuitry was not instructed to monitor layer-two control packets received from the second maintenance endpoint, and notify the first processing circuitry that the second circuitry received the layer-two control packet from the second maintenance endpoint.

The method may include using the first processing circuitry of the packet switch to instruct third processing circuitry of the packet switch to monitor second layer-two control packets received by the third processing circuitry and to notify the first processing circuitry if a second condition related to timing of receipt of the second layer-two control packets by the third circuitry has been satisfied. The method may also include using the third processing circuitry to receive the second control packets, determining, based on one of the received second control packets, that the second condition is satisfied, and notifying the first processing circuitry that the second condition is satisfied.

The second processing circuitry may receive the control packets via a first port of the packet switch and the third processing circuitry may receive the second control packets via a different second port of the packet switch. The instructing using the first processing circuitry may include instructing the second processing circuitry to monitor layer-two control packets sent by a first maintenance endpoint and received by the second processing circuitry. The method may also include using the second processing circuitry to receive a layer-two control packet from a second maintenance endpoint, to determine that the second processing circuitry is not configured to determine whether layer-two control packets received from the second maintenance endpoint satisfy the first condition, and to notify the third processing circuitry that the second processing circuitry will determine whether control packets subsequently received by the second processing circuitry from the second maintenance endpoint satisfy the first condition.

Figure 2:
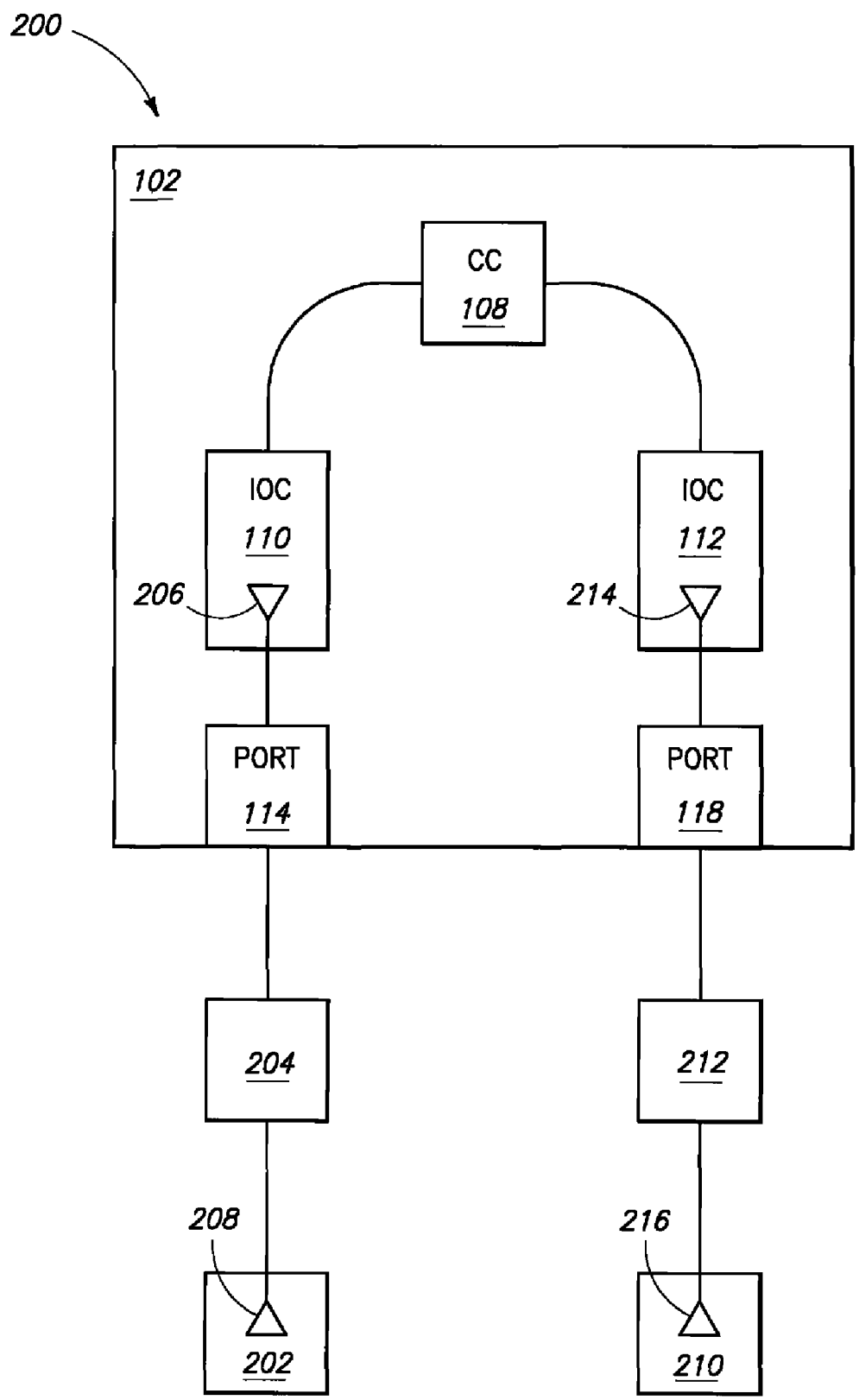
FIG. 2 is a block diagram of another network.

FIG. 2 illustrates a network 200. Network 200 includes packet switch 102. However, in FIG. 2, ports 116 and 120 of packet switch 102 are not illustrated. Port 114 of packet switch 102 is connected to device 204, which is connected to device 202. Similarly, port 118 of packet switch 102 is connected to device 212, which is connected to device 210. Devices 204 and 212 may be packet switches in one configuration. Although device 202 might not be physically connected to packet switch 102, it may be in communication with packet switch 102 via device 204 and therefore may be coupled to packet switch 102.

Input/output circuitry 110 includes a MEP 206, which may be associated with a MEP 208 located on device 202. MEP 206 and MEP 208 may cooperate to monitor connectivity between packet switch 102 and device 202. To do so, MEP 206 may send CCMs to MEP 208. MEP 208 may receive the CCMs and monitor for missing CCMs that may have been sent by MEP 206 but which are not received by MEP 208. In a similar manner, MEP 206 may monitor CCMs sent by MEP 208.

To initiate the transmission of CCMs to MEP 208 and the analysis of CCMs received from MEP 208, control circuitry 108 may configure a control packet processing procedure on input/output circuitry 110. For example, control circuitry 108 may send a message to input/output circuitry 110 that includes a maintenance association identifier for MEP 208, a frequency with which input/output circuitry 110 should transmit CCMs, and a timing condition related to the reception of CCMs from MEP 208.

Subsequent to being configured, input/output circuitry 110 may begin forming and transmitting CCMs having the maintenance association identifier to device 202 via port 114 at the frequency. Input/output circuitry 110 may continue forming and transmitting CCMs at the rate without any further interaction with control circuitry 108 until instructed otherwise by control circuitry 108. Note that input/output circuitry 110 may itself create the CCMs rather than receiving the CCMs from control circuitry 108 and then simply forwarding the CCMs to device 204.

Input/output circuitry 110 may also begin processing CCMs received from MEP 208 subsequent to being configured by control circuitry 108. In doing so, input/output circuitry 110 may monitor received CCMs having the maintenance association identifier and inform control circuitry 108 if the timing condition is satisfied. In one configuration, the timing condition may specify a fault period. The fault period may be a maximum amount of time that may pass without receiving a CCM having the maintenance association identifier before CCM should notify control circuitry 108.

Figure 3:
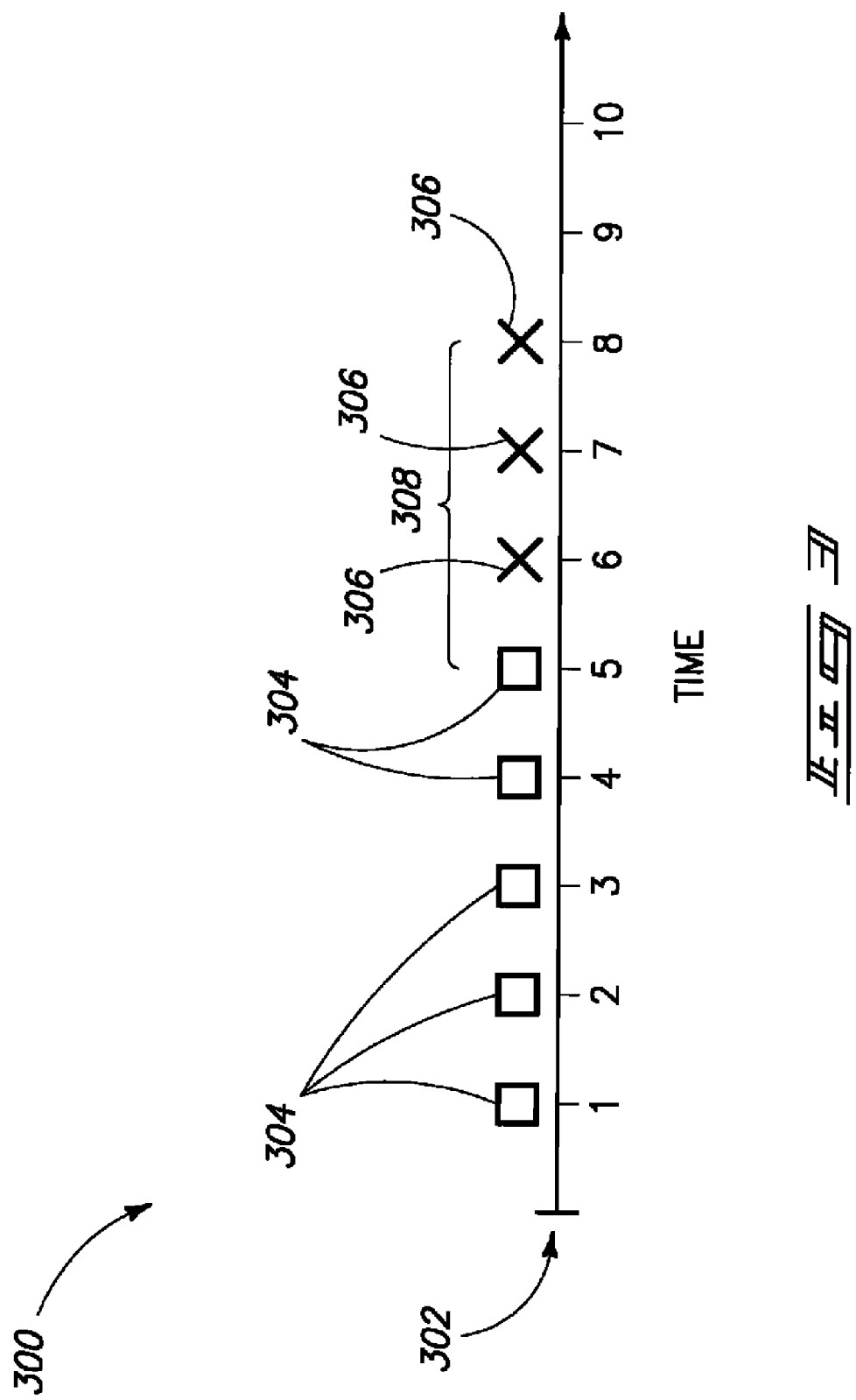
FIG. 3 is a chart illustrating control packet timing.

FIG. 3 is a chart 300 illustrating one example of timing associated with a fault period. At times 1, 2, 3, 4, and 5 on time axis 302, input/output circuitry 110 receives CCM packets 304 from MEP 208. Packets 304 may be received at a substantially regular interval since MEP 208 may be configured to transmit CCM packets 304 at a particular rate. Accordingly, input/output circuitry 110 may expect to receive a CCM at times 6, 7, and 8. However, as indicated at 306, input/output circuitry 110 does not receive a CCM having the maintenance identifier from MEP 208 at times 6, 7, or 8.

In one configuration, input/output circuitry 110 may be configured to start or reset a timer each time MEP 206 receives a CCM from MEP 208 having the maintenance identifier. If the timer reaches an amount of time equal to the fault period prior to subsequently receiving another CCM from MEP 208 having the maintenance identifier, input/output circuitry 110 may determine that the fault period has expired and in response may notify control circuitry 108. Accordingly, at time 5 input/output circuitry 110 may start or reset a timer and at time 8 the timer may reach the fault period, indicated as 308 in chart 300.

Returning now to FIG. 2, input/output circuitry 112 may include a MEP 214 and device 210 may contain a MEP 216. Control circuitry 108 may configure input/output circuitry 112 to transmit CCMs to MEP 216 and to process CCMs received from MEP 216 in a manner similar to that described above in relation to input/output circuitry 110. Input/output circuitry 112 may be configured to execute substantially the same control packet processing procedure as input/output circuitry 110.

However, control circuitry 108 may configure the control packet processing procedure of input/output circuitry 112 with parameters that differ from the parameters used to configure the control packet processing procedure of input/output circuitry 110. For example, control circuitry 108 may configure input/output circuitry 112 with a different maintenance association identifier since MEPs 214 and 216 may belong to a different maintenance association than MEPs 206 and 208.

Similarly, control circuitry 108 may configure input/output circuitry 112 to transmit CCMs to MEP 216 at a lower rate than the rate at which input/output circuitry 110 transmits CCMs to MEP 208. A different rate may be used, for example, because device 210 might not be capable of receiving CCMs at the same rate as device 202.

The control packet processing procedure implemented by input/output circuitry 110 and 112 may perform additional functions. For example, input/output circuitry 110 may receive a CCM belonging to a maintenance association that contains a remote defect indicator (RDI) (e.g., the RDI defined by the IEEE 802.1ag standard). In response, input/output circuitry 110 may notify control circuitry 108 of the RDI and input/output circuitry 110 may include the RDI in CCMs subsequently transmitted by input/output circuitry 110 that also belong to the maintenance association.

Furthermore, input/output circuitry 110 may notify input/output circuitry 112 of the RDI so that input/output circuitry 112 may include the RDI in CCMs it transmits that are associated with the maintenance association. Alternatively, control circuitry 108 may, in response to receiving notification of the RDI from input/output circuitry 110, notify input/output circuitry 112 of the RDI.

The control packet processing procedure may also implement other functions. For example, the procedure may participate in jitter, latency, and/or bandwidth measurements made using CCMs. In some cases, the procedure may participate in a loopback or link trace. In other cases, the procedure may simply forward LBM and LTM requests to control circuitry 108.

Figure 4:
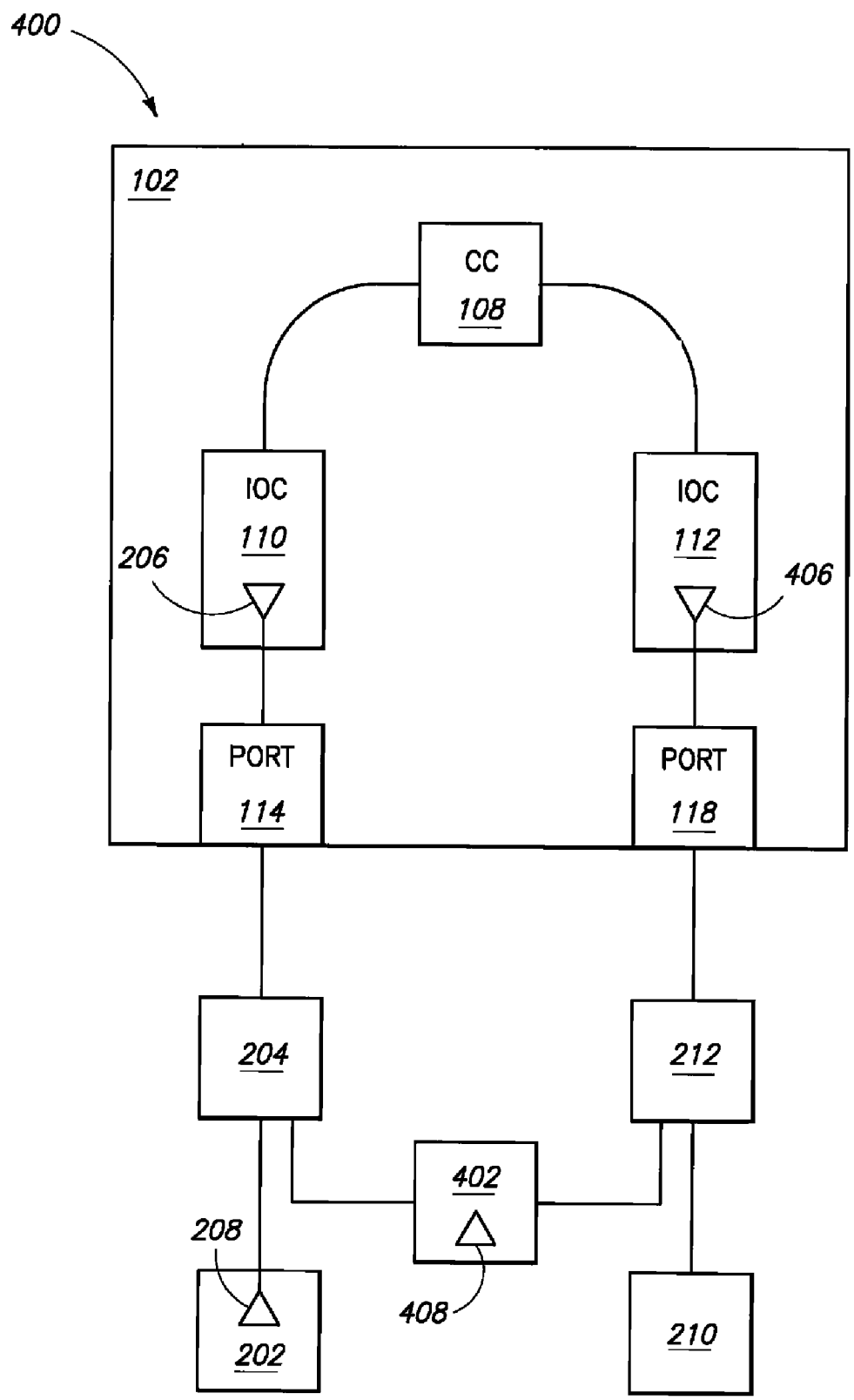
FIG. 4 is a block diagram of yet another network.

FIG. 4 illustrates a network 400 including packet switch 102 and devices 202, 204, 210, 212, and 402. Device 402 may communicate with packet switch 102 using one of two different paths. A first path may traverse device 212 and port 118 and a second path may traverse device 204 and port 114. Since device 402 is connected to both devices 204 and 212, a loop is created involving devices 204, 402, 212, and packet switch 102. These devices may use a spanning tree protocol to prevent packets from circulating through the loop. Accordingly, in one configuration the spanning tree protocol may block the connection between device 402 and device 204 so that device 402 communicates with packet switch 102 via device 212. Device 402 may include a MEP 408 that communicates with a MEP 406 located in input/output circuitry 112.

Device 202 may have connectivity to packet switch 102, which may be monitored using MEPs 206 and 208. Furthermore, device 402 may have connectivity to device 202 via packet switch 102. Accordingly, MEPs 206, 208, 406, and 408 may belong to a same maintenance association.

Control circuitry 108 may configure input/output circuitry 110 to receive and analyze CCMs from MEP 208 and to notify control circuitry 108 if a timing condition related to the CCMs is satisfied. However, since the link between device 402 and device 204 is blocked, control circuitry 108 might not configure input/output circuitry 110 to receive and analyze CCMs from MEP 408. Instead, control circuitry 108 may configure input/output circuitry 112 to receive and analyze CCMs from MEP 408.

If device 212 fails, spanning tree BPDUs may be used to detect the failure and to unblock the link between device 402 and device 204. Consequently, CCMs transmitted by MEP 408 may be received by input/output circuitry 110 rather than input/output circuitry 112. Since control circuitry 108 did not previously configure input/output circuitry 110 to process CCMs received from MEP 408, input/output circuitry 110 may, upon receiving a CCM from MEP 408, notify control circuitry 108 that a CCM was received from MEP 408. In response, control circuitry 108 may configure input/output circuitry 110 to process CCMs received from MEP 408. Alternatively, control circuitry 108 may initially configure input/output circuitry 110 to process CCMs from a MEP that input/output circuitry 110 might not have been aware of prior to receiving a CCM from the MEP, such as the CCM received from MEP 408.

Since input/output circuitry 112 does not receive CCMs from MEP 408 due to the failure of device 212, input/output circuitry 112, which is configured to monitor CCMs from MEP 408 may at some point determine that a timing condition has been satisfied and notify control circuitry 108. In response, control circuitry 108 may re-configure input/output circuitry 112 so that input/output circuitry 112 no longer monitors CCMs from MEP 408 since input/output circuitry 110 may now be monitoring CCMs from MEP 408.

Alternatively, input/output circuitry 110 may, upon receiving a CCM from MEP 408, notify input/output circuitry 112 that input/output circuitry 110 will be handling CCMs from MEP 408 and that input/output circuitry 112 need not monitor for CCMs from MEP 408 any longer.

Figure 5:
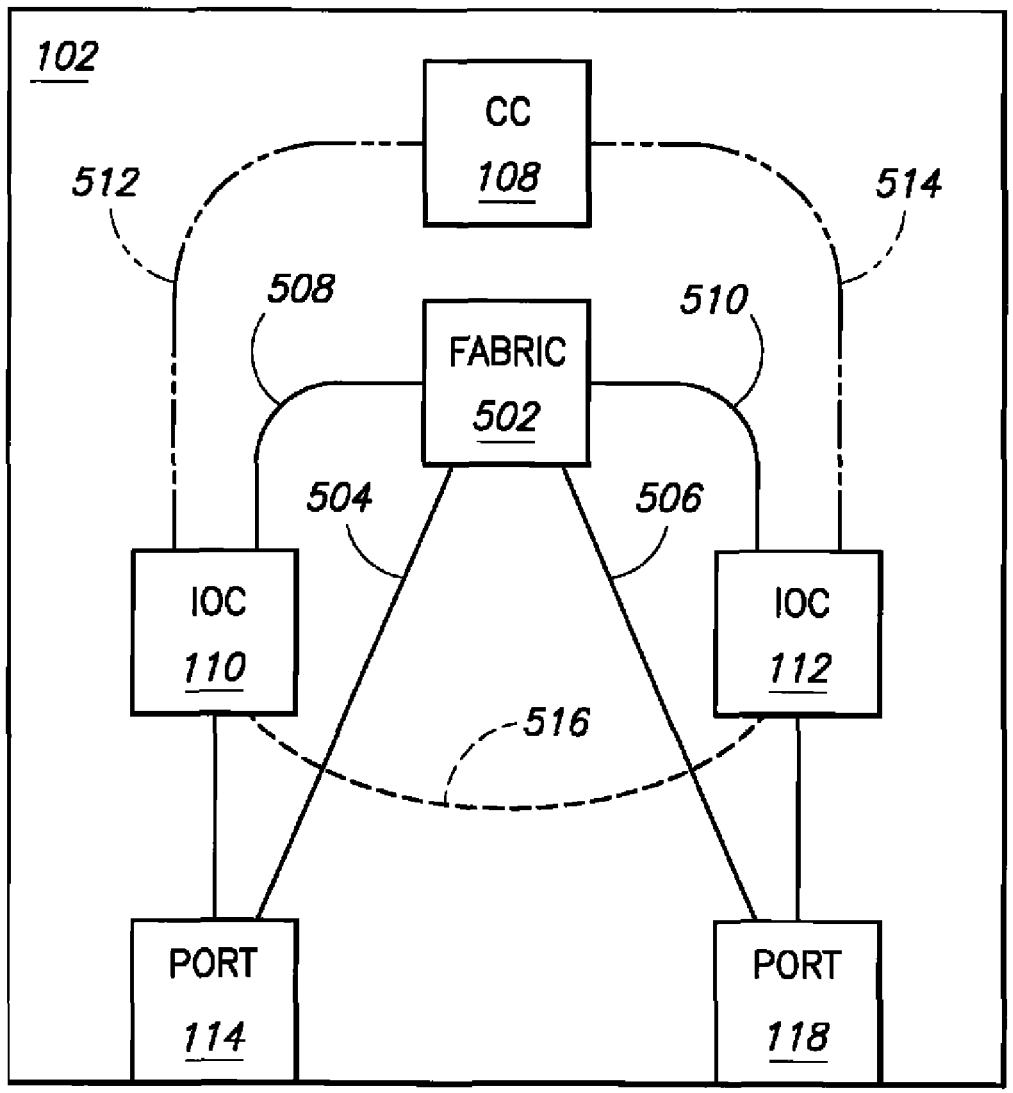
FIG. 5 is a block diagram of a packet switch.

FIG. 5 is a detailed block diagram of packet switch 102. As illustrated by FIG. 5, packet switch 102 includes a switching fabric circuitry 502. Switching fabric circuitry 502 may be connected to input/output circuitry 110 via connection 508, to input/output circuitry 112 via connection 510, to port 114 via connection 504, and to port 118 via connection 506. Furthermore, input/output circuitry 110 may be connected to input/output circuitry 112 via connection 516. As was previously illustrated, control circuitry 108 may be connected to input/output circuitry 110 via connection 512 and to input/output circuitry 112 via connection 514.

Switching fabric circuitry 502 may forward packets it receives to a destination. For example, switching fabric circuitry 502 may receive packets, including control packets, from input/output circuitry 110 and forward the packets to port 114, port 118, and/or input/output circuitry 112.

Connection 516 may enable communication between input/output circuitry 110 and input/output circuitry 112. For example, connection 516 may enable input/output circuitry 110 to instruct input/output circuitry 112 to include an RDI in CCMs transmitted by input/output circuitry 112.

In some configurations, control circuitry 108 may be connected to switching fabric circuitry 502 (connection not illustrated) so that control packets formed by control circuitry 108 may be forwarded by fabric 502 to port 114 and/or port 118. For example, input/output circuitry 110 may forward a LBM received from device 202 to control circuitry 108. Control circuitry 108 may respond to the LBM by sending a CFMPDU to device 202 via switching fabric circuitry 502 and port 114.

Figure 6:
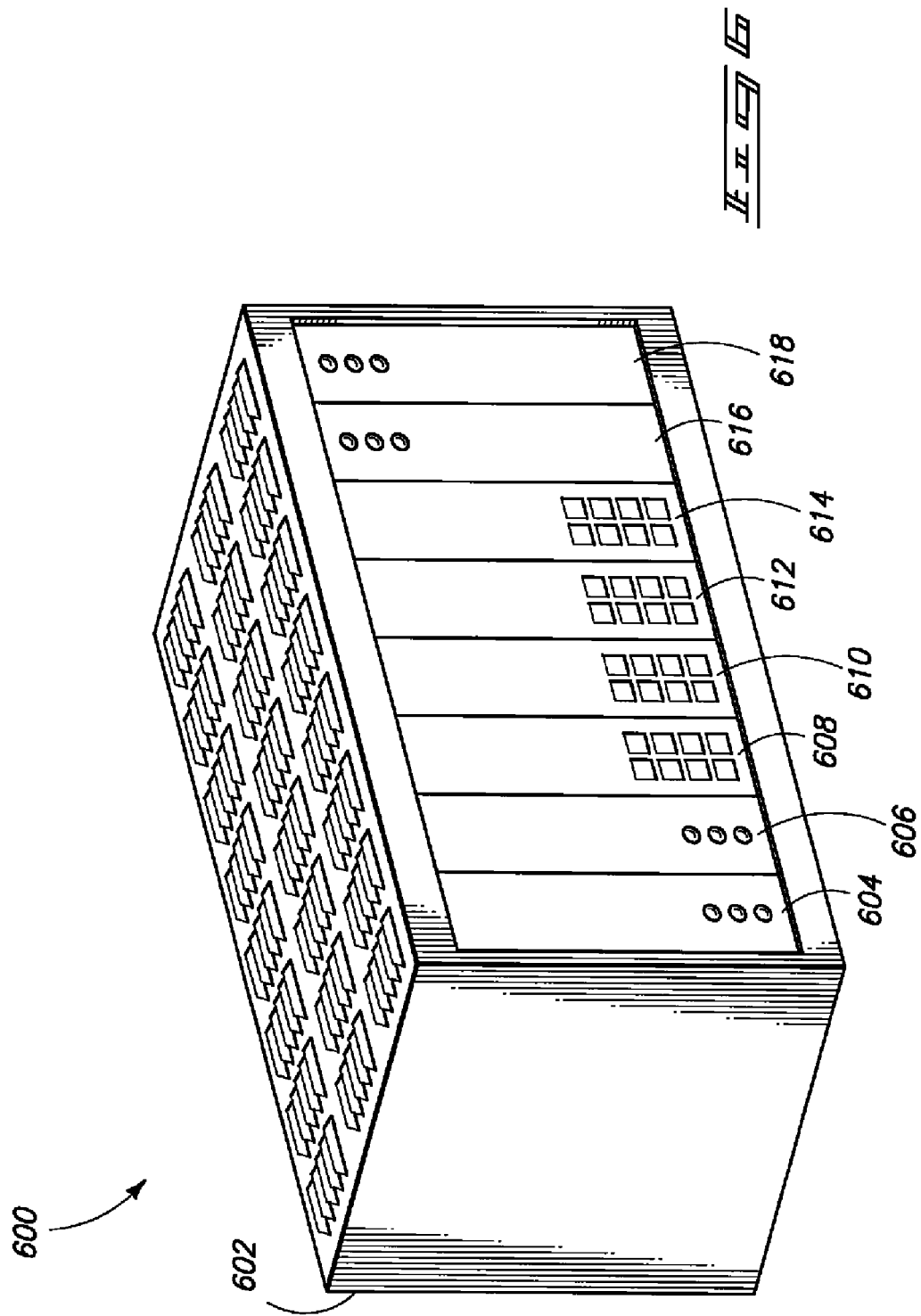
FIG. 6 is an isometric view of a packet switch.

FIG. 6 illustrates an example physical configuration 600 of packet switch 102. Physical configuration 600 includes a chassis 602; two control modules 604 and 606; four input/output modules 608, 610, 612, and 614; and two fabric modules 616 and 618. Chassis 602 may house the modules and may provide power and connectivity between the modules. Individual modules may be removed from chassis 602. In one configuration, an individual module may be removed from chassis 602 without interrupting operation of other modules housed by chassis 602.

Control module 604 may include control circuitry 108. Control module 606 may be a backup control module that is activated if control module 604 becomes disabled. Accordingly, control module 606 may include circuitry that is substantially a duplicate of control circuitry 108.

Input/output module 608 may include input/output circuitry 110 and input/output module 610 may include input/output circuitry 112. Input output modules 612 and 614 may include additional input/output circuitry of packet switch 102 not depicted in FIGS. 1-5.

Fabric module 616 may include switch fabric circuitry 502. Fabric module 618 may be a backup fabric module that is activated if fabric module 604 becomes disabled. Accordingly, fabric module 606 may include circuitry that is substantially a duplicate of switch fabric circuitry 502.

Accordingly, in one configuration, control circuitry 108 may be physically distinct from input/output circuitry 110 and from input/output circuitry 112 since it may be part of removable control module 604, which may be physically separated from chassis 602 without separating either input/output module 608 or input/output module 610 from chassis 602. Furthermore, input/output circuitry 110 may be physically distinct from input/output circuitry 112.

Of course, other physical configurations are also possible. For example, control circuitry 108 may be located in a first chassis, input/output circuitry 110 may be located in a second chassis, and input/output circuitry 112 may be located in a third chassis.

FIG. 7 illustrates a network 700. Network 700 includes packet switch 102 and devices 202, 204, 210, and 212 of FIG. 2. However, network 700 has a different MEP configuration than FIG. 2. Furthermore, switching fabric circuitry 502 and connections 504, 506, 508, 510, 512, 514, and 516 (discussed above in relation to FIG. 5) are also depicted.

Several MEP pairs are illustrated in FIG. 5. MEPs 704 and 702 are a first MEP pair that may be used to monitor a connection between device 202 and input/output circuitry 110. The first MEP pair may monitor the connection using CCMs as was described above. MEPs 710 and 712 are a second MEP pair that may be used to monitor a connection between device 210 and input/output circuitry 112. Like the first MEP pair, the second MEP pair may monitor the connection using CCMs as was described above.

MEPs 706 and 708 are a third MEP pair. The third MEP pair may monitor a connection extending from device 210, through device 212 to port 118, through connection 506 to switching fabric circuitry 502, and through connection 508 to input/output circuitry 110. Although the second and third MEP pairs both monitor connections between packet switch 102 and device 210, the MEP pairs monitor slightly different connections. The connections associated with the second and third MEP pairs both monitor between port 118 and device 210. However, the connection associated with the third MEP pair additionally monitors through switching fabric circuitry 502. Accordingly, the second MEP pair may monitor a connection which approximates a connection between device 210 and port 118 and the third MEP pair may monitor a connection which approximates a connection between device 210 and port 114.

Control circuitry 108 may configure input/output circuitry 110 to transmit CCMs to MEP 706. Input/output circuitry 110 may do so by generating CCMs intended for MEP 706 and forwarding the CCMs to switching fabric circuitry 502. Switching fabric circuitry 502 may forward the CCMs to port 118, which may transmit the CCMs to device 212 where they are relayed to device 210. Alternatively, input/output circuitry 110 (or control circuitry 108) may instruct input/output circuitry 112 to generate CCMs intended for MEP 706 that appear to be sourced by MEP 708. Input/output circuitry 112 may forward these CCMs to port 118 where they are relayed to device 210. Using this alternative approach may conserve forwarding capacity of switching fabric circuitry 502.

According to another aspect of the invention, a packet switch operating method includes using first processing circuitry of the packet switch to configure different second processing circuitry of the packet switch to periodically transmit control packets to a destination device via a port of the packet switch. Subsequent to the configuring, the method includes using the second processing circuitry to transmit the control packets to the destination device via the port during moments in time when the first processing circuitry is non-operational. The first processing circuitry may be unable to communicate with the second processing circuitry when the first processing circuitry is non-operational.

The method may include using the first processing circuitry to configure the second processing circuitry to monitor control packets received by the second processing circuitry and to notify the first processing circuitry if a condition related to timing of receipt of the received control packets by the second circuitry has been satisfied. The method may also include using the second processing circuitry to monitor the control packets received by the second processing circuitry to determine whether the condition is satisfied. The second processing circuitry may monitor the control packets during the moments in time when the first processing circuitry is non-operational.

Configuring the second processing circuitry may include providing, to the second processing circuitry, an identifier identifying a device originating the CCMs and a fault period comprising an amount of time. Monitoring the control packets may include determining whether the fault period has expired since receiving a most recently received one of the control packets.

The method may include using the second processing circuitry to determine that the first processing circuitry is non-operational. Subsequent to determining that the first processing circuitry is non-operational, the method may include receiving one of the control packets and in response to receiving the one control packet, determining that the condition is satisfied.

The method may also include using third processing circuitry to determine that the first processing circuitry is non-operational. The third processing circuitry may be configured to replace the functionality of the first processing circuitry. In response to determining that the first processing circuitry is non-operational, the method may include replacing the functionality of the first processing circuitry with the third processing circuitry. Subsequent to replacing the functionality, the method may include using the second processing circuitry to notify the third processing circuitry that the condition is satisfied.

FIG. 8 illustrates a network 800 including packet switch 102 and devices 202, 204, 210, and 212. Packet switch 102 include ports 114 and 118, input/output circuitry 110 and 112, and control circuitry 108 which have been described above. In addition, packet switch 102 includes control circuitry 802.

Control circuitry 802 may be connected to input/output circuitry 110 via connection 804, to input/output circuitry 112 via connection 806, and to control circuitry 108 via connection 808. Control circuitry 802, in one configuration, may be substantially similar to control circuitry 108 and may be configured as a backup for control circuitry 108. Accordingly, control circuitry 108 and control circuitry 802 may communicate with each other so that they are synchronized.

For example, control circuitry 108 may configure a control packet processing procedure of input/output circuitry 110. Before or after configuring the control packet processing procedure, control circuitry 108 may notify control circuitry 802 that control circuitry 108 configured the control packet processing procedure so that if control circuitry 108 becomes non-operational, control circuitry 802 may take over for control circuitry 108 having an accurate knowledge of the configuration of input/output circuitry 110.

By way of example, control circuitry 108 may configure input/output circuitry 110 to transmit CCMs at a particular rate. Input/output circuitry 110 may begin transmitting CCMs at the rate. Subsequently, control circuitry 108 may become non-operational. For example, control circuitry 108 may lose power or may become unresponsive. However, since input/output circuitry 110 might not rely on control circuitry 108 to transmit CCMs after having been configured by control circuitry 108, input/output circuitry 110 may continue to transmit CCMs at the rate despite the fact that control circuitry 108 is non-operational.

Control circuitry 802 may detect that control circuitry 108 is non-operational. Consequently, control circuitry 802 may perform the functionality of control circuitry 108. However, after taking over for control circuitry 108, control circuitry 802 might not need to communicate with input/output circuitry 110 regarding the transmission of CCMs at the rate unless control circuitry 802 needs to alter the rate or alter another aspect of the CCM transmission since input/output circuitry 110, once configured, may transmit CCMs independent of control circuitry 108 or control circuitry 802.

By way of another example, control circuitry 108 may configure input/output circuitry 110 to monitor CCMs received from a MEP and to notify control circuitry 108 if a timing condition is satisfied, as was described above in relation to FIG. 3. Subsequently control circuitry 108 may become non-operational. Input/output circuitry 110 may continue to monitor CCMs and determine whether the timing condition is satisfied even though control circuitry 108 may be non-operational. If the timing condition is not satisfied, input/output circuitry, 110 need not interact with control circuitry 108.

However, if the timing condition is satisfied, input/output circuitry 110 may detect that control circuitry 108 is non-operational and therefore might not notify control circuitry 108 regarding the satisfaction of the timing condition. Instead, input/output circuitry 110 may determine whether control circuitry 802 has taken over for control circuitry 108. If control circuitry 802 has taken over, input/output circuitry 110 may notify control circuitry 802 regarding the satisfaction of the timing condition. If control circuitry 802 has not taken over, input/output circuitry 110 may wait until control circuitry 802 has taken over before notifying control circuitry 802 regarding the satisfaction of the timing condition.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette or a ZIP® disk manufactured by the Iomega Corporation of San Diego, Calif.), hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of operating a packet switch comprising the steps of:
   using first processing circuitry of the packet switch, specifying a configuration for a control packet processing procedure implemented by different second processing circuitry of the packet switch,
   communicating the configuration to the second processing circuitry;
   using the second processing circuitry: receiving a control packet from a port of the packet switch, examining contents of the control packet, processing the control packet according to the control packet processing procedure, updating a status of a control protocol with respect to the port based on information conveyed by the control packet, and preventing the control packet from being forwarded to the first processing circuitry, the control packet processing procedure being configured according to the configuration and the control packet conforming to the control protocol; and
   using the first processing circuitry, accessing information describing the status and changing the configuration of the control packet processing procedure based on the information.

2. The method of claim 1 wherein:
   the control packet conforms to a layer-two control protocol;
   the packet switch is configured to process control packets according to the layer-two control protocol; and
   the receiving comprises receiving the control packet from another packet switch configured to process control packets according to the layer-two control protocol.

3. The method of claim 1:
   wherein the control packet comprises a first control packet and the first control packet comprises a request for information describing a configuration of the packet switch; and
   further comprising transmitting a second control packet comprising the information describing the configuration of the packet switch in response to the receiving the first control packet.

4. The method of claim 1 wherein the control packet conveys information describing a characteristic of a network to which the packet switch is connected and the processing the control packet comprises modifying a configuration of the packet switch based on the information.

5. The method of claim 1:
   wherein the configuration comprises a first configuration, the control packet comprises a first control packet; and
   further comprising:
      using the first processing circuitry, specifying a different second configuration for the control packet processing procedure, the control packet processing procedure also being implemented by different third processing circuitry of the packet switch;
      communicating the second configuration to the third processing circuitry; and
      using the third circuitry, receiving a second control packet and processing the second control packet according to the control packet processing procedure implemented by the third processing circuitry, the control packet processing procedure implemented by the third processing circuitry being configured according to the second configuration.

6. The method of claim 5:
   wherein the processing the first control packet using the second processing circuitry comprises specifying a different third configuration for the control packet processing procedure implemented by the third processing circuitry; and further comprising communicating the third configuration to the third processing circuitry.

7. The method of claim 1 wherein the processing comprises changing an operational state of the port.

8. The method of claim 1 wherein the contents of the control packet comprise a request for a response and the processing of the control packet according to the control packet processing procedure comprises the second processing circuitry transmitting a response packet comprising the response as a result of examining the contents of the control packet, the response packet having a different destination address than the control packet received by the second processing circuitry.

9. The method of claim 1 wherein the processing of the control packet according to the control packet processing procedure by the second processing circuitry comprises the second processing circuitry changing a status of a port of the packet switch from enabled to disabled or from disabled to enabled.

10. The method of claim 1 wherein the control packet is a connectivity fault management protocol data unit (CFMPDU) conforming to the Institute of Electrical and Electronics Engineers (IEEE) 802.1ag standard and/or the ITU-T Y.1731 standard, or the control packet is a bridge protocol data unit (BPDU).

11. A method of operating a packet switch comprising the steps of:

using first processing circuitry of the packet switch, instructing second processing circuitry of the packet switch to monitor layer-two control packets received by the second processing circuitry and to notify the first processing circuitry if a condition has been satisfied;

using the second processing circuitry, receiving the control packets;

determining, based on one of the received control packets, that the condition is satisfied; and notifying the first processing circuitry that the condition is satisfied;

wherein the instructing using the first processing circuitry comprises instructing the second processing circuitry to monitor layer-two control packets sent by a first source and received by the second processing circuitry; and further comprising:

using the second circuitry, receiving a layer-two control packet from a second source;

using the second circuitry, determining that the second circuitry is not configured to monitor layer-two control packets received from the second source; and using the second circuitry, notifying the first processing circuitry that the second circuitry received the layer-two control packet from the second source.

12. The method of claim 11 wherein the layer-two control packets are connectivity fault management protocol data units (CFMPDUs) conforming to the Institute of Electrical and Electronics Engineers (IEEE) 802.1ag standard and/or the ITU-T Y.1731 standard, the one received control packet is a Continuity Check Message (CCM), and further comprising, using the second processing circuitry, receiving a loopback message (LBM) CFMPDU or link trace message (LTM) CFMPDU and forwarding at least a portion of the LBM or LTM to the first processing circuitry.

13. The method of claim 11 wherein:

the control packets are CCMs compliant with the IEEE 802.1ag standard and/or the ITU-T Y.1731 standard;

the instructing comprises providing an identifier identifying a device originating the CCMs and a fault period comprising an amount of time to the second processing circuitry; and the determining comprises determining that the fault period has expired since receiving the one control packet and that no additional CCMs have been received by the second processing circuitry from the device during the fault period.

14. The method of claim 11 wherein the control packets comprise first control packets, the condition comprises a first condition, and further comprising:

using the first processing circuitry of the packet switch, instructing third processing circuitry of the packet switch to monitor second layer-two control packets received by the third processing circuitry and to notify the first processing circuitry if a second condition related to timing of receipt of the second layer-two control packets by the third circuitry has been satisfied; and using the third processing circuitry, receiving the second control packets; determining, based on one of the received second control packets, that the second condition is satisfied; and notifying the first processing circuitry that the second condition is satisfied.

15. The method of claim 14:

further comprising using the second processing circuitry, notifying the third processing circuitry that the second processing circuitry will determine whether control packets subsequently received by the second processing circuitry from the second source satisfy the first condition.

16. A packet switch comprising:

first processing circuitry;

second processing circuitry configured to receive a first control packet from a first port of the packet switch and to update a first status of a layer-two control protocol with respect to the first port based on information conveyed by the first control packet, the first control packet conforming to the layer-two control protocol;

wherein the first processing circuitry is coupled to the second processing circuitry and is configured to receive information describing the first status and to change a configuration of the second processing circuitry based on the information describing the first status;

third processing circuitry configured to receive a second control packet from a different second port of the packet switch and to update a second status of the layer-two control protocol with respect to the second port based on information conveyed by the second control packet, the second control packet conforming to the layer-two control protocol; and wherein the first processing circuitry is coupled to the third processing circuitry and is configured to receive information describing the second status and to change a configuration of the second processing circuitry and/or the third processing circuitry based on the information describing the second status.

17. The packet switch of claim 16 further comprising:

a switching fabric connected to the first and second ports and the second and third processing circuitry and configured to relay packets between the first port and the second port; and wherein the second processing circuitry is configured to forward a control packet conforming to the layer-two protocol to the second port via the switching fabric.

18. The packet switch of claim 16 wherein the second processing circuitry is coupled to the third processing circuitry and the second processing circuitry is configured to instruct the third processing circuitry to transmit a control packet conforming to the layer-two control protocol to the second port.

19. The packet switch of claim 16 further comprising:
a control module comprising the first processing circuitry;
a first input/output module comprising the second processing circuitry;
a second input/output module comprising the third processing circuitry; and
a chassis housing the first input/output module, the second input/output module, and the control module.

* * * * *